Feb. 13, 1945.  P. MARTIN  2,369,360
SAUSAGE SKINNING MACHINE
Filed June 29, 1943   2 Sheets-Sheet 1

INVENTOR
*Philip Martin*
BY
ATTORNEYS

Feb. 13, 1945.　　　　P. MARTIN　　　　2,369,360
SAUSAGE SKINNING MACHINE
Filed June 29, 1943　　　2 Sheets-Sheet 2
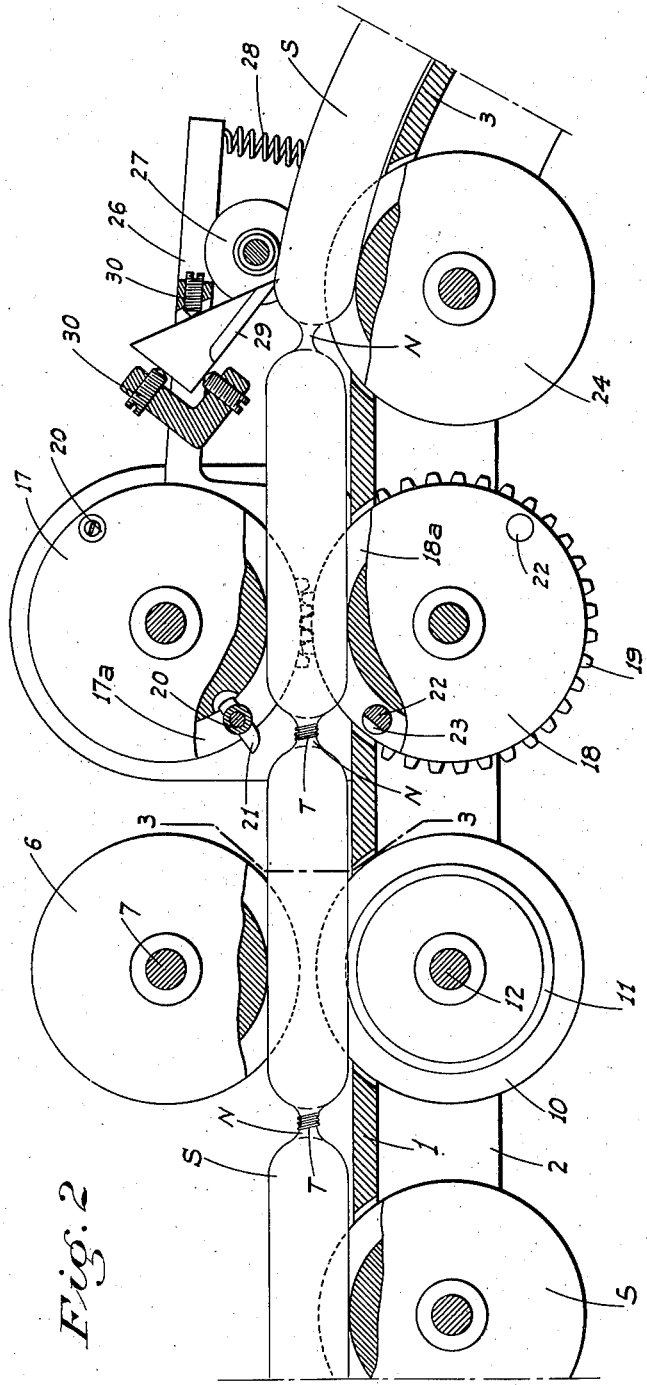
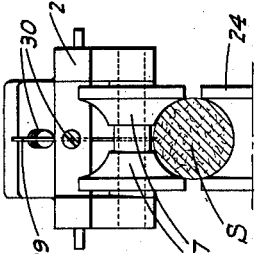
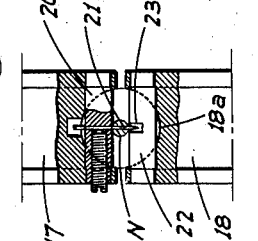
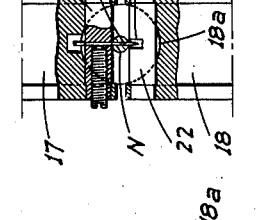
INVENTOR
*Philip Martin*
BY
ATTORNEYS Patented Feb. 13, 1945

2,369,360

UNITED STATES PATENT OFFICE 2,369,360

SAUSAGE SKINNING MACHINE

Philip Martin, Tarzana, Calif.

Application June 29, 1943, Serial No. 492,704

16 Claims. (Cl. 17—1)

This invention relates to a machine for skinning sausages after initial cooking by the manufacturer, and when a number of the sausages are linked together in a string with the individual sausages tied together at adjacent ends, where they are connected by a relatively small or pinched-in neck, as usual.

The principal object of this invention is to provide a machine for the purpose which engages and advances a string of sausages lengthwise, and while the sausages are so moving not only cuts the skins lengthwise but also cuts through the ties between the sausages, without then disturbing the actual linkage or interfering with the further movement of the same as a continuous string.

The machine will then remove the cut skin from the sausages and leave the latter in an individual or separated condition ready for cooking.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is an enlarged fragmentary sectional elevation of the machine showing the tie-cutting unit disposed ahead of the point of cutting.

Figure 3 is a fragmentary cross section on the line 3—3 of Fig. 2 showing the bottom rotary skin cutter.

Figure 4 is a fragmentary sectional elevation of the tie-cutting unit in a cutting position.

Figure 5 is a fragmentary cross section on the line 5—5 of Fig. 4.

Figure 6 is a fragmentary end view showing the top skin cutting unit.

Figure 1:
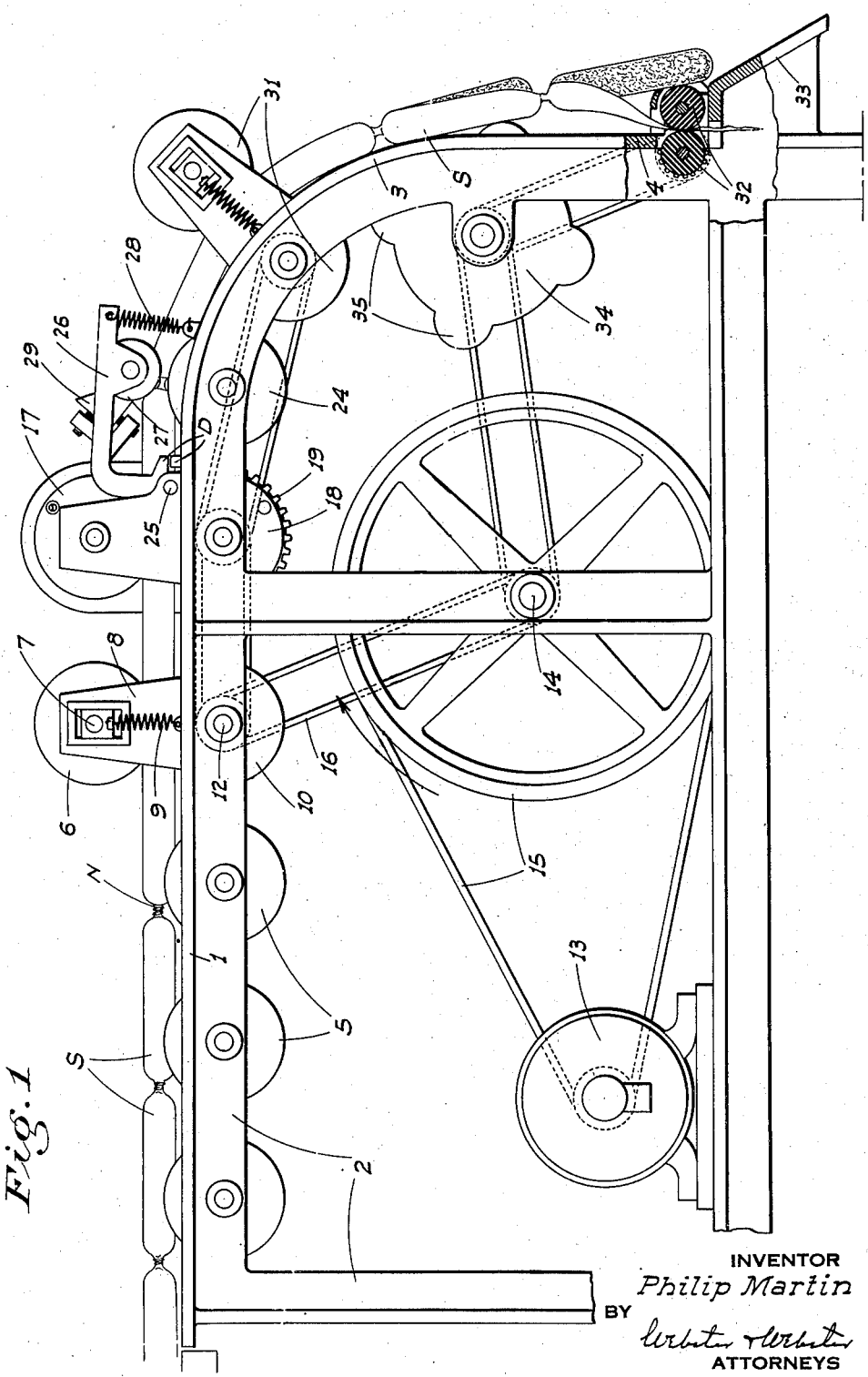
Figure 1 is a side elevation of my improved machine.

Referring now more particularly to the characters of reference on the drawings, the machine comprises a flat metal table 1 suitably supported by a depending framework 2, the table at its discharge end curving downwardly as at 3 on a somewhat large radius and terminating in a straight depending portion 4. A row of rollers 5, curved to fit the sausages S, are journaled on the framework 2 and project through the table adjacent the feed end thereof sufficiently to support and guide the sausages in clearance relation to the table.

Beyond the rollers 5 the sausages successively pass between and are engaged by a feed roller unit. This unit includes upper and lower rollers, the upper roller 6 being grooved to fit the sausage from above and having an axial shaft 7 supported for vertical sliding movement in brackets 8 upstanding from the table; the roller being yieldably pressed down by springs 9 acting on the bearings of shaft 7.

The lower roller comprises oppositely grooved and facing roller elements 10 spaced apart sufficient to receive a thin rotary cutter 11 which projects radially out from the bottom of the roller grooving sufficiently to cut through the skin of a sausage supported on said roller without appreciably cutting into the meat.

The shaft 12 on which the roller elements and cutter are fixed is journaled in the framework 2 and is driven at a suitable sausage feeding and cutting speed from an electric motor 13 mounted on the framework 2. This motor preferably drives a countershaft 14 at a reduced speed through the medium of a belt drive 15; another belt drive 16 connecting the countershaft and the shaft 12, as shown in Fig. 1.

Beyond the feed roller unit the sausages successively pass between another pair of vertically spaced grooved rollers 17 and 18 connected together to turn at the same speed and in positive timed relation by gearing 19; the lower roller 18 being driven at the same speed as the feed roller unit, either directly from the shaft 12 as indicated in Fig. 1, or from the countershaft 14, as may seem best.

A cross pin 20 is fixed in the upper roller 17 and extends across the sausage engaging groove 17a therein; this pin supporting a removable and adjustable knife 21 which projects through the pin radially of the roller and centrally of the width of the groove. This knife is of sufficient length to project into the groove of the lower roller 18 when the knife is vertically disposed. When the knife is in this position it cooperates with another cross pin 22 mounted in the roller 18 and extending across the sausage engaging groove 18a therein, said pin 22 having a slot 23 into which the blade projects, as shown in Fig. 4.

The cross pins are spaced apart so that when disposed in vertical alinement with each other and with the axes of the rollers, they will just receive the relatively small tied connecting neck N of adjacent sausages therebetween; said neck being then supported against deflection so that the knife 21 will readily cut through the tie string T of the neck in a direction lengthwise of the string of sausage without actually severing or destroying the continuity of the skin. Since the rollers 17 and 18 adjacent their periphery rotate at the same speed as the forward travel of the sausages, the cross pins and knife pass into and out of the space between adjacent necks without abutting the sausages or tending to stop their forward movement. As many tie cutting units may be mounted on one pair of rollers as the size of the latter may necessitate to meet the above requirements.

Beyond the string cutting unit the sausages pass over another grooved guide roller 24, preferably disposed just beyond the inception of the curved portion 3 of the table. While supported on the roller 24 the skin of the sausages is cut or slit lengthwise along the top by the following means:

Pivoted in a fixed position some distance ahead of the roller 24, as at 25, is an upstanding bracket 26. This bracket overhangs the roller 24 and carries a small groved roller unit 27 which rides on a sausage engaged by the roller 24; the roller unit 27 being disposed relative to the roller 24 so that the sausage will extend substantially at right angles to a radial line projected between the rollers 24 and 27. The bracket 26 is yieldably pressed down by a spring 28 or other suitable means so that the roller unit 27 firmly engages the sausage.

Adjustably mounted in the bracket is a straight edged pointed knife or blade 29, set at a rearward angle to the sausage and so that its point only cuts through the skin of the sausage immediately adjacent the point of contact of the roller unit 27 with the sausage, as shown in Fig. 2. The knife is held in place by a number of set screws 30 so that the depth of cutting may be regulated or the blade removed for re-sharpening or replacement when necessary. Since the roller unit rides on the sausage and follows any undulations in the contour thereof, the knife will always cut to the same depth. To prevent undue downward movement of the bracket 26 and parts thereon, as the rollers 27 leave the sausage, I provide a suitable stop device D between the bracket and the table, as indicated in Fig. 1.

Beyond the top skin cutting unit above described, the sausages may pass between the rollers 31 of another driven feed unit, after which they naturally assume a straight depending position as they generally follow the depending portion 4 of the table. This additional feed roller unit, in connection with the curving portion of the table, assures that the sausages will have a curving form as they move over the roller 24. This will have a tendency to make the top of the skin quite taut so that the knife 29 will more readily and effectively cut the same.

A pair of driven-gear connected contacting rubber rollers 32 are mounted on the framework 2 adjacent the lower end of the portion 4, with one roller outwardly of the table. These rollers form a skin stripping unit, the skin passing between said rollers and the skinned sausages sliding over the outermost roller, as shown in Fig. 1, and being then engaged by a deflecting plate 33 which maintains the sausages separated from the skins and enables them to be discharged into a suitable container placed below the plate 33.

Between the stripping rollers and the feed unit 31 I preferably place a device to loosen or knock the sausages from the cut skins. This device is in the form of a rotary driven member 34 mounted on the framework 2 under the table and having peripheral projections 35 adapted to project through the table into the path of the sausages moving toward the stripping unit, and spaced so that each projection in turn will suddenly engage a sausage moving past and will tend to knock the same out of its skin, which is held tensioned by reason of the engagement of the skin with the stripping rollers.

In operation, the string of sausages is initially fed between the feed rollers 7 and 10 in such relation to the tie cutting unit that the neck N of the foremost pair of sausages will be positioned for cutting by the knife 21 when it reaches the same. Thereafter each neck in turn will be automatically so positioned, since the advancing speed of the sausages is coordinated with the rotating speed of the rollers 17 and 18, as previously described, so that the knife is returned to a cutting position as each successive neck passes between the rollers.

In the arrangement here shown the skin is first cut lengthwise along the bottom by the rotary cutter 11, the tie string is then cut, after which the skin is cut lengthwise along the top, leaving the skin of the string of sausages ready for removal from the individual sausages but still in an unbroken continuous condition.

When the string of sausages reaches the stripping rollers, the adjacent end of the skin is initially placed by the operator between said rollers, after which no attention need be given for an entire string of sausages.

It is to be here noted that while I show the preferred arrangement and positioning of the various cutting units, such position may be changed if desired without affecting the operation of the machine.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A machine for skinning link sausages initially in string form and tied together at adjacent ends, comprising means to advance the string of sausages, means to cut through the skins of successive sausages lengthwise as they advance, and means to cut through the ties at the ends of and between adjacent sausages.

2. A machine as in claim 1, with means to strip the skins from the sausages with their advance after such skins have been cut.

3. A machine for skinning link sausages initially in string form and tied together at adjacent ends, comprising means to advance the string of sausages, means to cut through the skins of successive sausages lengthwise as they advance, and means to cut through the ties at the ends of and between adjacent sausages without severing the skins of adjacent sausages.

4. A machine as in claim 3, with means to then strip the skin as a continuous member from the sausages as they advance.

5. A machine as in claim 1, with means to strip the skins from the sausages with their advance after such skins have been cut and means maintaining the skinned sausages segregated from the skin.

6. A machine as in claim 3, with means to then strip the skin as a continuous member from the sausages as they advance; said last named means comprising a pair of driven gripping rollers between which the skin is initially fed.

7. A machine as in claim 3, with means to then strip the skin as a continuous member from the sausages as they advance, said last named means comprising a pair of driven gripping rollers between which the skin is initially fed, the sausages as they are skinned successively riding over one of the rollers, and a deflecting plate arranged to engage and guide the sausages as they become disengaged from said roller.

8. A machine as in claim 1, in which said sausage advancing means comprises a pair of rollers spaced apart and grooved to receive the sausages therebetween in single file order, means to drive one roller and means yieldably urging the rollers radially toward each other.

9. A machine as in claim 1, in which the skin cutting means comprises transversely spaced roller elements grooved to seat and receive a sausage, and a blade disposed centrally between the elements and projecting radially out beyond the bottom of the roller grooving.

10. A machine as in claim 1, in which the skin cutting means comprises transversely spaced roller elements grooved to seat and receive a sausage, a blade disposed centrally between the elements and projecting radially out beyond the bottom of the roller grooving, and means mounting the roller elements and blade as a unit for yieldable movement in a direction radially of the elements.

11. A machine as in claim 1, in which the skin cutting means comprises transversely spaced roller elements grooved to seat and receive a sausage, and over which the latter rides, means above the elements yieldably pressing down on the sausage, a rotary cutter mounted between the elements to engage and cut through the skin of the sausage, and means to rotate the cutter.

12. A machine as in claim 1, with means to strip the skins from the sausages with their advance after such skins have been cut, and means acting on the sausages adjacent and ahead of the stripping means tending to knock the sausages from the skin.

13. A machine as in claim 1, with means to strip the skins from the sausages with their advance after such skins have been cut, and means acting on the sausages adjacent and ahead of the stripping means tending to knock the sausages from the skin; said last named means comprising a driven rotary member and spaced peripheral projections on the member adapted to project into the path of the sausages moving toward the stripping means.

14. A machine for skinning link sausages initially in string form and tied together at adjacent ends, comprising means to advance the string of sausages in an initially horizontal direction, means to cut through the skins of the sausages lengthwise and from below as they advance, means to then cut through the ties at the ends of adjacent sausages, means to then cut through the skins of the sausages from above as they advance, and means to then strip the cut skin from the sausages.

15. A machine for skinning link sausages initially in string form and tied together at adjacent ends, comprising means to advance the string of sausages in an initially horizontal direction, means to cut through the skins of the sausages lengthwise and from below as they advance, means to then cut through the ties at the ends of adjacent sausages in a direction lengthwise of the sausages and of their advancing movement whereby to retain the skin between adjacent sausages as a continuous element and means to subsequently strip the cut skin continuously from the string of sausages.

16. A machine as in claim 1, in which said tie cutting means comprises a pair of rollers connected for rotation at the same speed in opposite directions and grooved to receive the advancing sausages therebetween, means to drive one roller at a predetermined speed relative to the sausage advancing speed, a pair of similarly positioned cross pins mounted in the rollers and projecting across the grooves therein and so that when alined with the roller axes they are spaced apart sufficiently only to receive the tied end of adjacent sausages therebetween, and a blade mounted in one pin and projecting radially out sufficient to cut through said tied end and project into a slot provided in the other cross pin when said pins are so alined.

PHILIP MARTIN.